United States Patent
Kawabata

Patent Number: 5,157,298
Date of Patent: Oct. 20, 1992

[54] BRUSHLESS MOTOR WITH GREATER EFFICIENCY

[75] Inventor: Yasutomo Kawabata, Aichi, Japan

[73] Assignee: Toyota Jidosha Kabushiki Kaisha, Aichi, Japan

[21] Appl. No.: 508,473

[22] Filed: Apr. 13, 1990

Related U.S. Application Data

[63] Continuation of Ser. No. 242,751, Sep. 9, 1988, abandoned.

[30] Foreign Application Priority Data

Sep. 11, 1987 [JP] Japan ................... 62-227801

[51] Int. Cl.⁵ ............. H02K 21/12; H02K 37/14; H02K 21/00; H02K 3/28
[52] U.S. Cl. ................. 310/156; 310/49 R; 310/162; 310/180
[58] Field of Search ............ 310/49 R, 162, 156, 310/179, 180, 184, 198, 216; 318/138, 254

[56] References Cited

U.S. PATENT DOCUMENTS

| | | | |
|---|---|---|---|
| 378,456 | 2/1888 | Moses | 310/159 |
| 564,702 | 7/1886 | Lamme | 310/159 |
| 4,190,779 | 2/1980 | Schaeffer | 310/156 |
| 4,566,179 | 1/1986 | Sawyer et al. | 310/216 |
| 4,626,727 | 12/1986 | Janson | 310/156 |
| 4,687,961 | 8/1987 | Horber | 310/216 |
| 4,719,378 | 1/1988 | Katsuma et al. | 310/208 |
| 4,806,812 | 2/1989 | Masterman | 310/156 |

FOREIGN PATENT DOCUMENTS

| | | |
|---|---|---|
| 62-44057 | 2/1987 | Japan . |
| 62-44095 | 2/1987 | Japan . |
| 62-38073 | 3/1987 | Japan . |
| 62-38075 | 3/1987 | Japan . |
| 62-161574 | 10/1987 | Japan . |

*Primary Examiner*—Steven L. Stephan
*Assistant Examiner*—Clayton E. LaBalle
*Attorney, Agent, or Firm*—Finnegan, Henderson, Farabow, Garrett, Dunner

[57] ABSTRACT

A brushless motor energized by an M-phase alternating current having a stator with $M \cdot m$ (m is an even number) teeth, a coil wound around each of the teeth, and a rotor with $(M+1) \cdot m$ permanent magnets. Since the coil is wound around each tooth, cancellation of magnetic fluxes produced by adjacent coils is minimized, which results in a greater efficiency of the motor. Since one coil corresponds to less than one magnet, irregularity on the induced voltage of the coils barely occurs, which results in a smoother output torque of the motor.

8 Claims, 5 Drawing Sheets

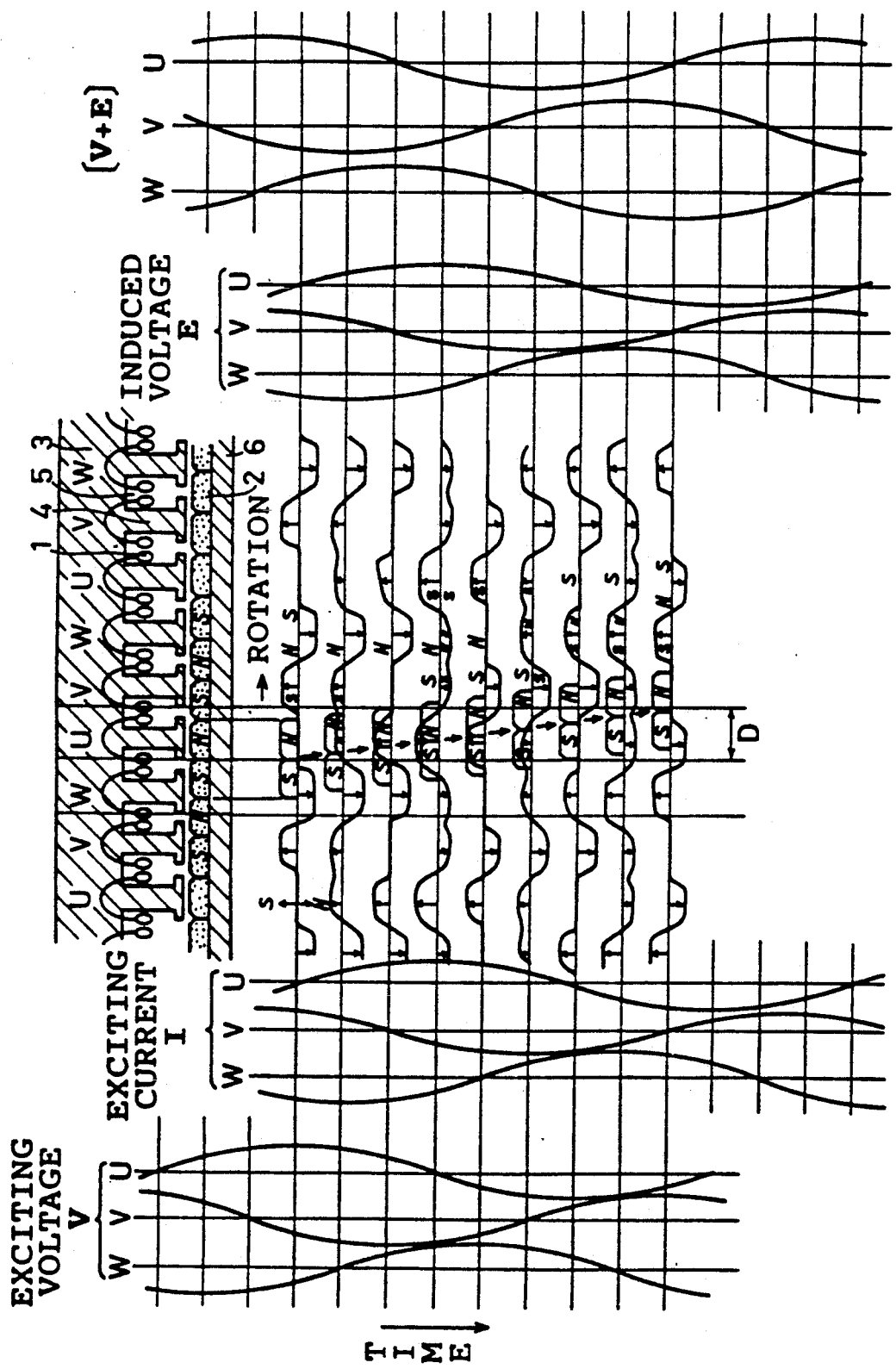

5,157,298

BRUSHLESS MOTOR WITH GREATER EFFICIENCY

This application is a continuation of application Ser. No. 07/242,751, filed Sep. 9, 1988, abandoned.

BACKGROUND OF THE INVENTION

The present invention relates to a brushless motor which is energized by a poly-phase alternating current.

So-called radial gap type brushless motors with a radially running magnetic flux have been structured as in FIG. 5. The stator 23 has M·m teeth projecting toward a rotor 26 having m magnets 22, where M is the number of phases of the source current. In case of a three phase motor (M=3), for example, each exciting coil 21 is wound around two teeth of the stator 23 traversing two slots 25 (and one tooth 24) in between. Thus every coil 21 corresponding to the phase V of the source current traverses the other two coils corresponding to the other two phases U and W. The m sets of the three coils 21 are arranged around m permanent magnets 22 on the rotor 26 which include N and S poles placed alternately (therefore, the number m must be an even number).

The left column of FIG. 6 shows a change in the three phases U, V and W of the exciting current of the motor with respect to time. Each phase changes sinusoidally as time progresses (downward in FIG. 6) and is different by 120° from the other two phases, which produces a rotating (leftward in FIG. 6) magnetic field, as shown in the middle of FIG. 6. The magnetic field produced by the coils 21 surrounds the rotor 26 and has m poles (N poles and S poles alternating) each corresponding to a pole of the magnets 22 on the rotor 26. Thus, the magnets 22 follow the rotating magnetic field, as the middle column sequentially shows from top to bottom, which produces the rotating movement of the rotor 26. The hatched curve on the fourth row of the middle column shows the magnetic field corresponding to the position of the rotor 26 as shown at the top of FIG. 6. The right column of FIG. 6 shows a change in the phase of voltage of the three coils induced by the movement of the magnets 22. The induced voltage is basically sinusoidal, but an irregularity is superposed thereon. The irregularity occurs when the boundaries between the N poles and S poles of the magnets 22 pass the slots 25 between teeth 24.

There are largely two drawbacks in the prior-art motors thus structured. First, the magnetic flux generated by a coil corresponding to one phase is partially canceled by opposite magnetic fluxes generated by the neighboring (and traversing) two coils corresponding to their respective phases at the traversing areas; this weakens the resultant magnetic field and decreases the efficiency of the motor. Second, the irregularity on the induced voltage causes a fluctuation in the output torque of the motor because the number of the magnets is the same as, or just n times, that of the exciting coils, so all the boundaries between the magnets 22 pass the slots 25 between teeth 24 simultaneously.

When the voltage induced in the coils becomes more closely sinusoidal, the rotation of the rotor becomes smoother. In the prior-art brushless motor, the ideal sinusoidal curve is difficult to obtain even when the shape of the magnets is properly modified. Such modification may instead decrease the output torque.

SUMMARY OF THE INVENTION

An object of the invention is therefore to provide a brushless motor with high efficiency.

Another object of the invention is to provide a brushless motor with less fluctuation in the output torque.

In order to achieve these and other objects, a brushless motor of the present invention, which is energized by an M-phase alternating current, comprises: a stator having a plurality of teeth arranged circularly, the number of the teeth being M·m, where m is an even number; a coil wound around each of the teeth of the stator; and a rotor having a plurality of permanent magnets arranged circularly facing the plurality of teeth of the stator with the N poles and the S poles of the permanent magnets placed alternately, the number of the permanent magnets being (M+1)·m.

Since each coil is wound around one tooth of the stator, cancellation of the magnetic fluxes produced by adjacent coils is minimized. This means that magnetic fluxes produced by the coils are used completely and effectively in moving the magnets on the rotor, which yields greater efficiency from the motor.

As M+1 magnets face M coils (or M teeth), all magnets never face all coils at any time. This eliminates so-called dead points at which attracting and repulsing forces between the magnets and coils are all at zero when all of the magnets face all of the coils, one magnet per coil. A smoother output torque is thus obtained by the present invention. Since there is no need to modify the shape of the corner edge of the magnets in order to obtain a smoother sinusoidal curve of the induced voltage, as described above in the explanation of prior-art brushless motors, the output torque of a brushless motor can be maximized by the present invention.

BRIEF EXPLANATION OF THE ATTACHED DRAWINGS

Figure 4:
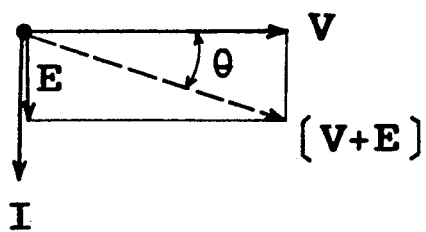
Figure 5:
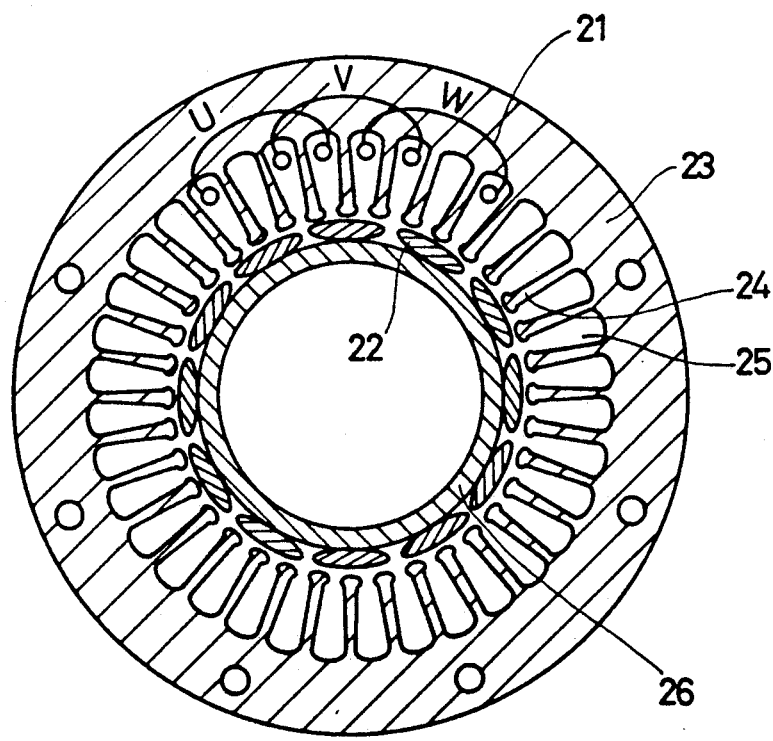

FIG. 3 is an explanatory diagram showing a linearly expanded figure of the stator and rotor (upper center), the exciting voltages V (far left column), the exciting currents I (second left column), a sequence of changes in the magnetic field produced by the coil and the movement of the magnets following the magnetic field (lower center), the induced voltages in the coils (second right column), and curves of V+E (far right column);

FIG. 4 is a vector diagram showing a summation of voltage vectors V and E;

FIG. 5 is a cross-sectional view of a prior-art brushless motor; and

Figure 6:
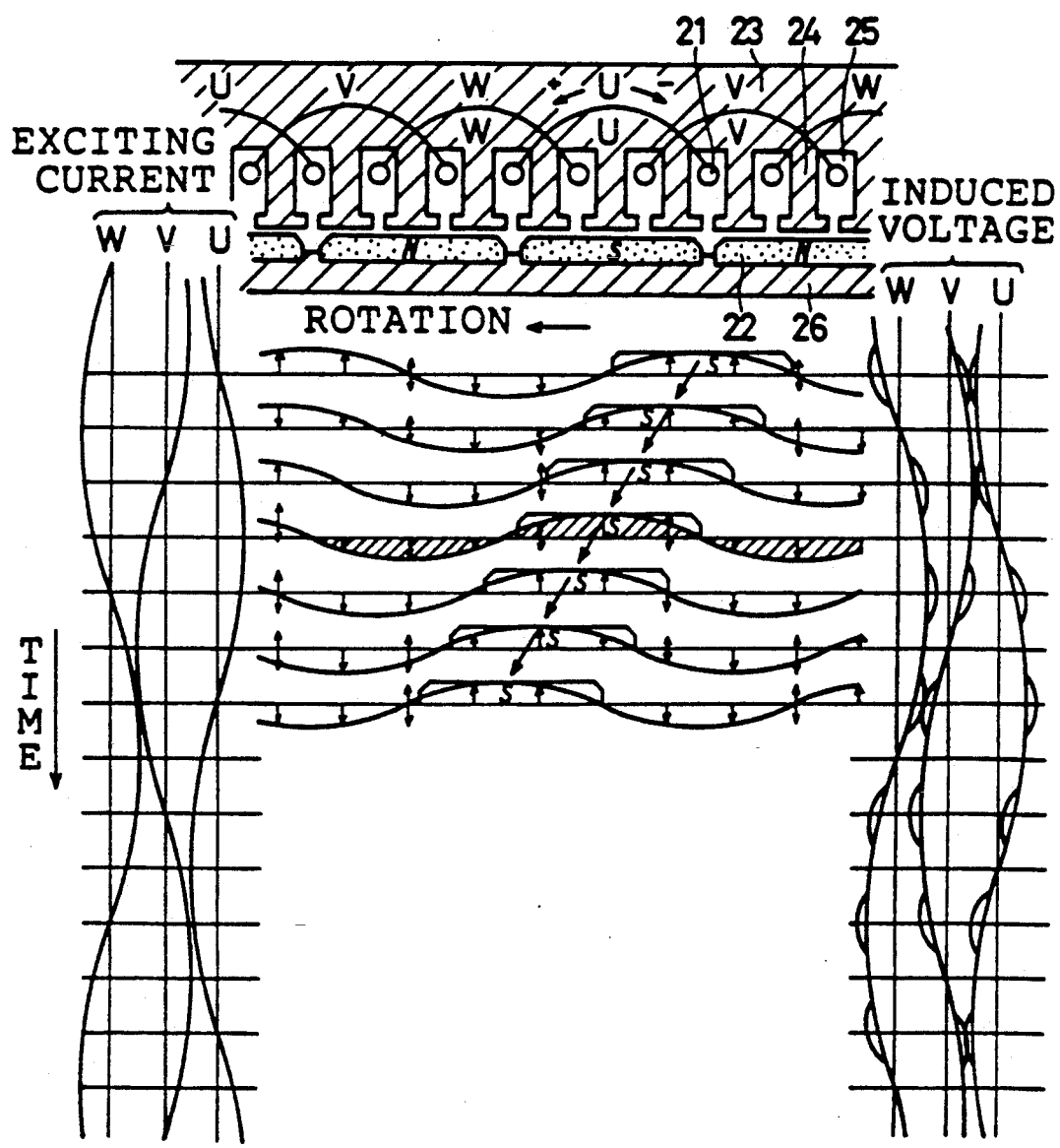

FIG. 6 is an explanatory diagram showing a linearly expanded figure of the stator and rotor in the prior-art brushless motor (upper center), the exciting currents fed into the coils (left column), the sequence of changes in the magnetic field produced by the coils and the movement of the magnets following the magnetic field (lower center), and the voltages induced in the coils by the movement of the magnets (right column)

DETAILED DESCRIPTION OF THE PREFERRED EMBODIMENT

Figure 1:
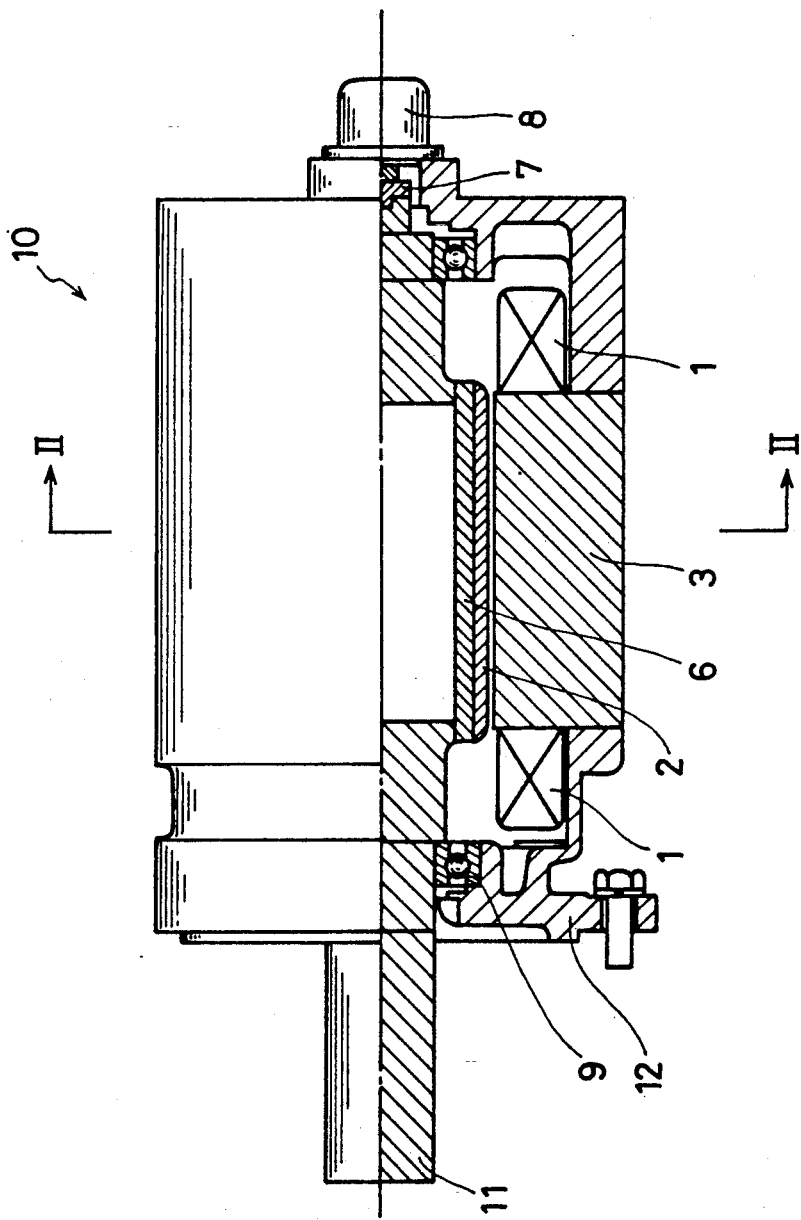
FIG. 1 is an outside view at the upper half and a sectional view at the lower half of a brushless motor as an embodiment of the present invention.

The invention may be best understood by referring to the following description of the preferred embodiment of the present invention. The three-phase brushless motor 10 in FIG. 1 has a cylindrical rotor 6 at its center and a stator 3 surrounding the rotor 6. The rotor 6 is connected to a rotor shaft 11 at one end and is provided with, via a coupling 7, an encoder 8 at the other end for sensing the rotation of the rotor 6. The sensed signal from the encoder 8 is output to a motor controller, which is not shown. The rotor shaft 11 is supported by a ball bearing unit 9 secured at an end of a housing 12 of the motor 10. The stator 3 is fixed to the housing 12.

Figure 2:
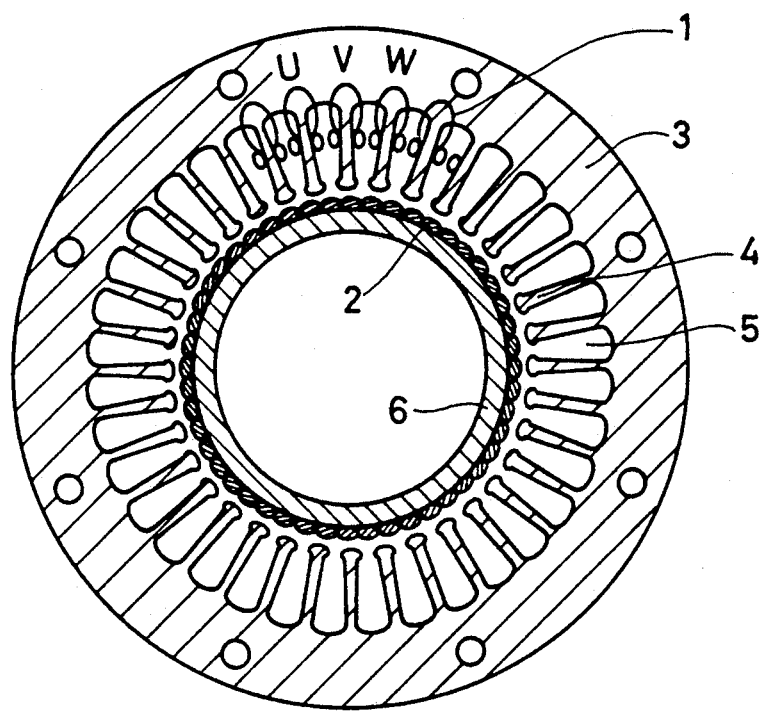
FIG. 2 is a cross-sectional view taken along line II—II of FIG. 1.

The cross sectional view in FIG. 2 better illustrates the position of the rotor 6 and stator 3. The stator 3 has, regularly arranged, 36 teeth 4 projecting inward toward the rotor 6. A coil 1 is wound around each tooth 4 of the stator 3 and three coils corresponding to the three phases U, V and W are placed neighboring with one another in that order. That is, each of the three phases U, V and W of the exciting current of the motor 10 is connected to 12 coils that are sequentially connected. On the surface of the rotor 6, 48 magnets 2 are attached with the N poles and S poles alternating circumferentially. Thus, an array of four magnets 2 (N, S, N and S poles) corresponds to an array of three teeth 4, or to three coils 1, one each of the three phases U, V and W. In this example, therefore, the number M in the generalized description of this invention is 3 and the number m is 12, which makes $3 \cdot 12 = 36$ teeth 4 on the stator 3 and $(3+1) \cdot 12 = 48$ magnets 2 on the rotor 6.

An operation sequence of the brushless motor 10 is now explained with reference to FIG. 3. The upper middle figure clearly shows the correspondence between three coils 1 (or teeth 4) and four magnets 2. The exciting voltage V shown at the far left column produces the exciting current I shown at the second left column in the coils 1 wound around the teeth 4. Since the exciting voltage V applied to the coils 1 changes sinusoidally with respect to time (downward in FIG. 3), the exciting current I also changes sinusoidally but with a phase delay of 90°. The exciting current I flowing in the coils 1 produces a magnetic field around the teeth 4. The nine curves drawn in the lower middle portion of FIG. 3 show the change in the magnetic field generated by the changing exciting current I while a magnet 2 following the magnetic field moves a pitch D equal to the distance between teeth 4 (or coils 1). The curve above the center line corresponds to the S pole of the magnetic field and that below the center line to the N pole. The magnetic flux produced by each coil 1 is independent from, and not influenced by, the magnetic fluxes produced by the other coils 1. Therefore, no cancellation between the magnetic fluxes of adjacent coils 1 occurs, and the magnetic flux produced by the exciting current I is fully operative in attracting and repulsing the magnets 2, which results in a greater efficiency of the motor 10.

As the magnets 2 pass by the teeth 4, with coils 1 wound around each tooth, the voltage E is induced in the coils 1 as shown by the second right column of FIG. 3. The induced voltage E has the same phase as the exciting current I and, thus, is delayed by 90° from the exciting voltage V. Unlike the induced voltage of the prior-art brushless motor shown in FIG. 6, the induced voltage E of the embodiment shown in FIG. 3 does not bear such irregularities. In the prior-art brushless motor shown in FIGS. 5 and 6, each sequence of three slots 25 corresponds to one magnet 22 and the induced voltage curve is deformed at every slot 25. On the other hand, because a slot 5 of the present embodiment in FIGS. 1–4 corresponds to less than one magnet (or one boundary between magnets), such irregularity does not occur.

Since the exciting voltage V is applied to the coils 1, the resultant voltage on the coils 1 is the sum of the exciting voltage vector V and the induced voltage vector E, as shown in FIG. 4. The induced voltage E is delayed 90° from the exciting voltage V, as already mentioned. The strength of the induced voltage E (or the length of the E vector) depends on the rotating speed of the motor 10. Thus, the angle $\theta$ between the exciting voltage vector V and the resultant voltage V + E varies as the speed of the motor 10 varies. The curve of the resultant voltage V + E shown in the far right column of FIG. 3 is approximately sinusoidal because the exciting voltage V is sinusoidal and the induced voltage E is close to a sinusoidal curve without irregularities.

Obviously, many modifications and variations of the present invention are possible in light of the above teachings. It is, therefore, to be understood that, within the scope of the appended claims, the invention may be practiced other than as specifically described.

What is claimed is:

1. An M-phase brushless motor comprising:
    balanced M-phase energizing source means for supplying M sinusoidal excitation voltages;
    a stator having a plurality of teeth arranged circularly at a fixed interval, the number of teeth being M·m, where m is an even number;
    a coil wound around each of the teeth of the stator, wherein, in any group of M adjacent coils, each excitation voltage is connected to only one coil in the group; and
    a rotor having a plurality of permanent magnets arranged circularly facing the plurality of teeth of the stator with the N poles and the S poles of the permanent magnets placed alternately, the number of the permanent magnets being (M+1)·m;
    wherein an excitation current associated with each excitation voltage flows through each coil, the excitation current being delayed in phase 90° from the excitation voltage associated therewith; and
    wherein the permanent magnets induce an induced voltage in each of the coils, wherein the induced voltages in the coils are in phase with the excitation currents associated with the coils.

2. A brushless motor according to claim 1, wherein each coil is wound around a stator tooth such that no coil overlaps the coils wrapped around other stator teeth.

3. A three-phase brushless motor comprising:
    balanced three-phase energizing source means for supplying there sinusoidal excitation voltages;
    a stator having a plurality of teeth arranged circularly at a fixed interval, the number of teeth being 3·m, where m is an even number;
    a coil wound around each of the teeth of the stator, wherein, in any group of three adjacent coils, each excitation voltage is connected to only one coil in the group; and
    a rotor having a plurality of permanent magnets arranged circularly facing the plurality of teeth of the stator with the N poles and the S poles of the permanent magnets place alternately, the number of the permanent magnets being 4·m;
    wherein an excitation current associated with each excitation voltage flows through each coil, the excitation current being delayed in phase 90° from the excitation voltage associated therewith; and wherein the permanent magnets induce an induced voltage in each of the coils, wherein the induced voltages in the coils are in phase with the excitation currents associated with the coils.

4. A brushless motor according to claim 3, wherein each coil is wound around a stator tooth such that no coil overlaps the coils wrapped around other stator teeth.

5. An M-phase brushless motor comprising:
balanced M-phase energizing source means for supplying M sinusoidal excitation voltages;
a stator having a plurality of teeth arranged circularly at a fixed interval, the number of teeth being M·m, where m is an even number;
a coil wound around each of the teeth of the stator, wherein, in any group of M adjacent coils, each excitation voltage is connected to only one coil in the group; and
a rotor having a plurality of permanent magnets arranged circularly facing the plurality of teeth of the stator with the N poles and the S poles of the permanent magnets placed alternately, the number of the permanent magnets being (M+1)·m;
wherein the phase of the excitation current of each coil differs from the phase of the excitation current of adjacent coils by $2\pi/m$, the magnetic flux generated by each coil is formed independently of the magnetic flux generated by other coils, and the coils connected to each excitation voltage are sequentially connected to the other coils connected to the same excitation voltage.

6. A brushless motor according to claim 5, wherein each coil is wound around a stator tooth such that no coil overlaps the coils wrapped around other stator teeth.

7. A three-phase brushless motor comprising:
balanced three-phase energizing source means for supplying three sinusoidal excitation voltages;
a stator having a plurality of teeth arranged circularly at a fixed interval, the number of teeth being 3·m, where m is an even number;
a coil wound around each of the teeth of the stator, wherein, in any group of three adjacent coils, each excitation voltage is connected to only one coil in the group; and
a rotor having a plurality of permanent magnets arranged circularly facing the plurality of teeth of the stator with the N poles and the S poles of the permanent magnets placed alternately the number of the permanent magnets being 4·m;
wherein the phase of the excitation current of each coil differs from the phase of the excitation current of adjacent coils by $2\pi/m$, the magnetic flux generated by each coil is formed independently of the magnetic flux generated by other coils, and the coils connected to each excitation voltage are sequentially connected to the other coils connected to the same excitation voltage.

8. A brushless motor according to claim 7, wherein each coil is wound around a stator tooth such that no coil overlaps the coils wrapped around other stator teeth.

* * * * *